US012334654B2

(12) United States Patent
Liu et al.

(10) Patent No.: US 12,334,654 B2
(45) Date of Patent: Jun. 17, 2025

(54) NETWORK COMMUNICATION DEVICE WITH ANTENNA FRAME

(71) Applicant: Sercomm Corporation, Taipei (TW)

(72) Inventors: Hsien-Wen Liu, Taipei (TW); Chih-Wen Tseng, Taipei (TW)

(73) Assignee: Sercomm Corporation, Taipei (TW)

( * ) Notice: Subject to any disclaimer, the term of this patent is extended or adjusted under 35 U.S.C. 154(b) by 133 days.

(21) Appl. No.: 18/182,396

(22) Filed: Mar. 13, 2023

(65) Prior Publication Data

US 2023/0327340 A1 Oct. 12, 2023

(30) Foreign Application Priority Data

Apr. 8, 2022 (CN) ......................... 202210366292.5

(51) Int. Cl.
*H01Q 9/04* (2006.01)
*H01Q 1/12* (2006.01)

(52) U.S. Cl.
CPC ............. *H01Q 9/0414* (2013.01); *H01Q 1/12* (2013.01)

(58) Field of Classification Search
CPC ............................... H01Q 9/0414; H01Q 1/12
See application file for complete search history.

(56) References Cited

U.S. PATENT DOCUMENTS

2012/0188140 A1* 7/2012 Bin Jamlus ............ H01Q 9/285
343/795

FOREIGN PATENT DOCUMENTS

| | | |
|---|---|---|
| CN | 1201436 | 5/2005 |
| CN | 201072802 | 6/2008 |
| CN | 201130704 | 10/2008 |
| CN | 201805457 | 4/2011 |
| CN | 206388838 | 8/2017 |
| CN | 206558668 | 10/2017 |
| CN | 206628586 | 11/2017 |
| CN | 210866466 | 6/2020 |
| CN | 210979760 | 7/2020 |
| CN | 214256755 | 9/2021 |
| CN | 215266646 | 12/2021 |
| TW | M408141 | 7/2011 |
| TW | 201251192 | 12/2012 |
| TW | M561335 | 6/2018 |

OTHER PUBLICATIONS

"Office Action of China Counterpart Application", issued on Apr. 11, 2025, p. 1-p. 8.

* cited by examiner

*Primary Examiner* — Graham P Smith
(74) *Attorney, Agent, or Firm* — JCIPRNET

(57) ABSTRACT

A network communication device having an antenna frame includes a circuit board, a network communication chip, an antenna, a signal cable and an antenna frame. The network communication chip is disposed on the circuit board. The signal cable is electrically connected to the antenna and the circuit board. The antenna frame is assembled on the circuit board. The antenna frame has a slot. The antenna is engaged in the slot. The antenna is directly fixed on the circuit board through the antenna frame, and the assembling of the antenna is easy to complete.

6 Claims, 11 Drawing Sheets

NETWORK COMMUNICATION DEVICE WITH ANTENNA FRAME

CROSS-REFERENCE TO RELATED APPLICATION

This application claims the priority benefit of China application serial no. 202210366292.5, filed on Apr. 8, 2022. The entirety of the above-mentioned patent application is hereby incorporated by reference herein and made a part of this specification.

BACKGROUND

Field of the Disclosure

The disclosure relates to a network communication device, in particular to a network communication device with an antenna frame.

Description of Related Art

In the past few years, because of the rapid development of wireless communication technology and the Internet of Things (IOT), an increasing number of electronic devices are required to have network function and therefore they are defined as network communication devices. In order to have the ability to connect to the Internet, it is not only necessary provide a network communication chip on a circuit board of a network communication device, but also an antenna for transmitting and receiving radio frequency (RF) signals is required, and the number of antennas is still increasing.

At present, the antenna is fixed on the housing of the network communication device by an adhesive or other means, and then connected to the circuit board through a signal cable. However, since the circuit board and the housing are different components, not only that a long signal cable is required for connection with the antenna, but also the signal cable falls off easily when being pulled, making assembly difficult and time-consuming. After the antenna is assembled to the housing and connected to the circuit board, a test needs to be performed on the whole assembly. When the test result is not good and the position and angle of the antenna need to be adjusted, it not only takes a lot of time, but also requires a higher production cost.

SUMMARY OF THE DISCLOSURE

The disclosure is related to a network communication device, which may solve the problem of assembling an antenna.

According to an embodiment of the present disclosure, the network communication device includes a circuit board, a network communication chip, an antenna, a signal cable and an antenna frame. The network communication chip is disposed on the circuit board. The signal cable is electrically connected to the antenna and the circuit board. The antenna frame is assembled on the circuit board. The antenna frame has a slot. The antenna is engaged in the slot.

In the network communication device according to an embodiment of the present disclosure, the antenna is engaged in the slot along the first direction. The antenna has a first position-limiting structure, and the antenna frame further has a second position-limiting structure. The first position-limiting structure is engaged with the second position-limiting structure to limit the movement of the antenna in the slot in the second direction, and the first direction is perpendicular to the second direction.

In the network communication device according to an embodiment of the present disclosure, the antenna is engaged in the slot along the first direction. The antenna frame has a position-limiting structure. The position-limiting structure limits the movement of the antenna in the slot in the second direction. The first direction is perpendicular to the second direction.

In the network communication device according to an embodiment of the present disclosure, the antenna frame further has an opening for exposing the feeding point of the antenna, and the signal cable is electrically connected to the feeding point.

In the network communication device according to an embodiment of the present disclosure, the antenna frame further has a plurality of pins, and the pins are inserted into the circuit board. The ends of the pins have barbs to hook on the circuit board.

In the network communication device according to an embodiment of the present disclosure, the antenna frame further has an extension portion. The extension portion has a first side and a second side opposite to each other. The slot is located on the first side, and the second side is assembled on the circuit board.

In the network communication device according to an embodiment of the present disclosure, the antenna frame further has a cable management portion, and a part of the signal cable is located in the cable management portion.

In the network communication device according to an embodiment of the present disclosure, the antenna frame is assembled on a lateral side of the circuit board.

According to another embodiment of the present disclosure, the network communication device includes a circuit board, a network communication chip, an antenna, a signal cable, and an antenna frame. The network communication chip is disposed on the circuit board. The signal cable is electrically connected to the antenna and the circuit board. The antenna frame is assembled on the circuit board. The antenna frame has a tenon. The tenon passes through the antenna and the antenna is fastened.

In the network communication device according to an embodiment of the present disclosure, the antenna frame further has a plurality of pins. The pins are inserted into the circuit board, and the ends of the pins have barbs to hook on the circuit board.

In the network communication device according to an embodiment of the present disclosure, the antenna frame further has an extension portion. The extension portion has a first side and a second side opposite to each other, the tenon is located on the first side, and the second side is assembled on the circuit board.

In the network communication device according to an embodiment of the present disclosure, the antenna frame further has a cable management portion, and a part of the signal cable is located in the cable management portion.

In the network communication device according to an embodiment of the present disclosure, the antenna frame is assembled on a lateral side of the circuit board.

Based on the above, in the network communication device of the present disclosure, the antenna is directly fixed on the circuit board through the antenna frame, and the assembling of the antenna is easy to complete.

DESCRIPTION OF EMBODIMENTS

The network communication device in various embodiments of the present disclosure is, for example, a home gateway or a mesh wireless relay that supports smart speakers, a wireless access point using a 6 GHz unlicensed frequency band, an XGS-PON home gateway that supports 4*4 11ax WiFi, a tri-band high-end XGS-PON home access gateway supporting 6 GHz, a tri-band pocket mesh wireless relay supporting WiFi6, a WiFi6 router supporting smart voice dialogue, or a hybrid set-top box supporting AV1 decoding and 11ax WiFi, but the present disclosure is not limited thereto.

Figure 1:
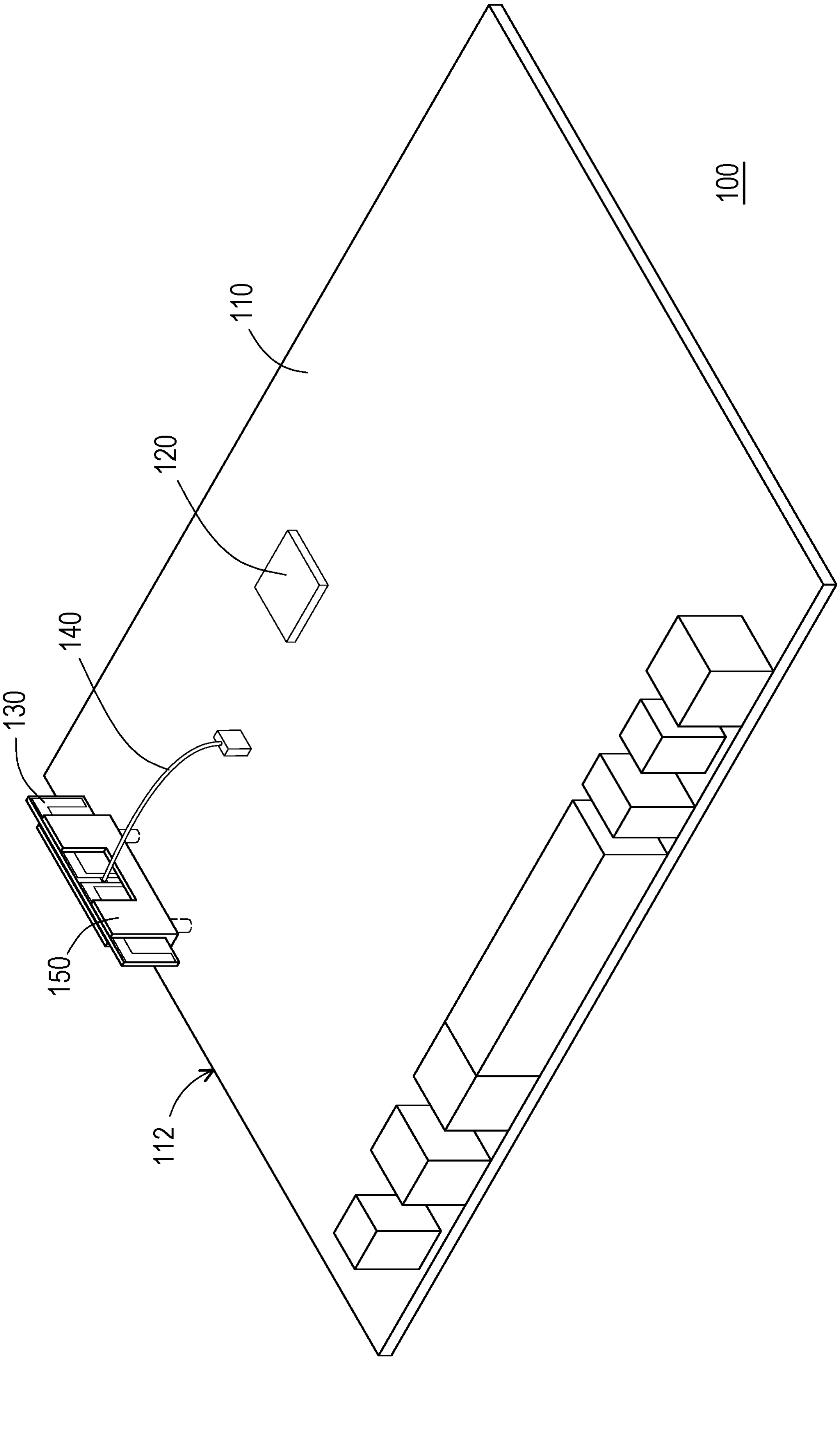
FIG. 1 is a schematic view of a network communication device according to an embodiment of the present disclosure.

FIG. 1 is a schematic view of a network communication device according to an embodiment of the present disclosure. Although the appearance component and other components of the network communication device 100 are not shown in FIG. 1, the network communication device of the present disclosure may be equipped with various forms of appearance components and other components according to requirements, and no further description is incorporated here. The network communication device 100 of this embodiment includes a circuit board 110, a network communication chip 120, an antenna 130, a signal cable 140 and an antenna frame 150. The network communication chip 120 is disposed on the circuit board 110. The network communication chip 120 is, for example, a radio frequency chip (RF chip), a transceiver chip, a baseband chip, a system on a chip, etc. The signal cable 140 is electrically connected to the antenna 130 and the circuit board 110, and the circuit board 110 is electrically connected to the signal cable 140 and the network communication chip 120. In other words, the antenna 130 is electrically connected to the network communication chip 120 through the signal cable 140 and the circuit board 110. The antenna frame 150 is assembled on the circuit board 110. The antenna frame 150 has a slot 152. The antenna 130 is engaged in the slot 152.

In the network communication device 100 of this embodiment, the antenna frame 150 is assembled on the circuit board 110, so the relative positions of the two are fixed. The antenna 130 is locked in the slot 152, so the relative positions of the two are fixed. In other words, the relative positions of the antenna 130 and the circuit board 110 are fixed. Therefore, in the process of assembling the circuit board 110 on the housing, there is no need to consider whether the connection between the antenna 130 and the circuit board 110 will be affected. The overall assembly is easy and fast, and the signal cable 140 does not easily fall off when being pulled. Compared with the antenna being disposed on the housing, the length of the signal cable 140 in this embodiment may also be reduced. In addition, because the position and angle of the antenna 130 relative to the circuit board 110 may be arranged and tested in advance, and the antenna 130 may be easily fixed at an optimal position and angle relative to the circuit board 110 through a properly designed antenna frame 150, it is possible to reduce the tests and time for making adjustment, and the production cost may be decreased.

In the network communication device 100 of this embodiment, the antenna frame 150 is assembled on the lateral side 112 of the circuit board 110 and may be away from other components on the circuit board 110. In addition, the antenna frame 150 is detachably assembled on the circuit board 110, and the antenna 130 is detachably locked in the slot 152. Therefore, when the type, size, and assembling position of the antenna 130 need to be changed according to different designs, they may be changed easily without spending too much cost.

Figure 2A:
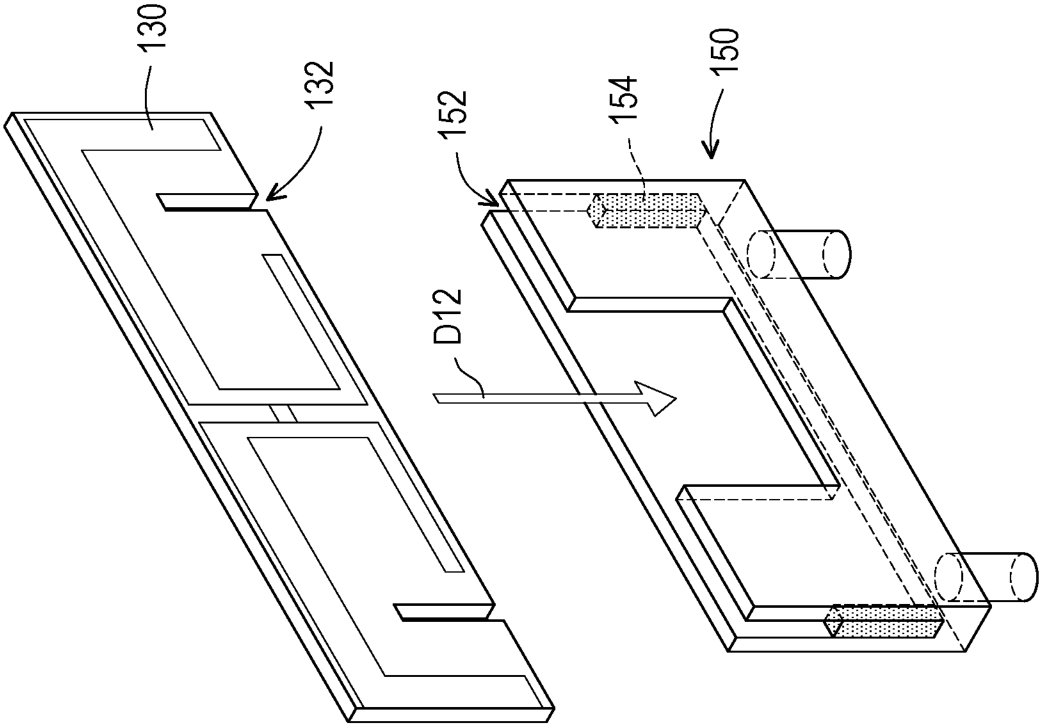
FIG. 2A is a schematic view of the antenna and the antenna frame of FIG. 1 being assembled.
Figure 2B:
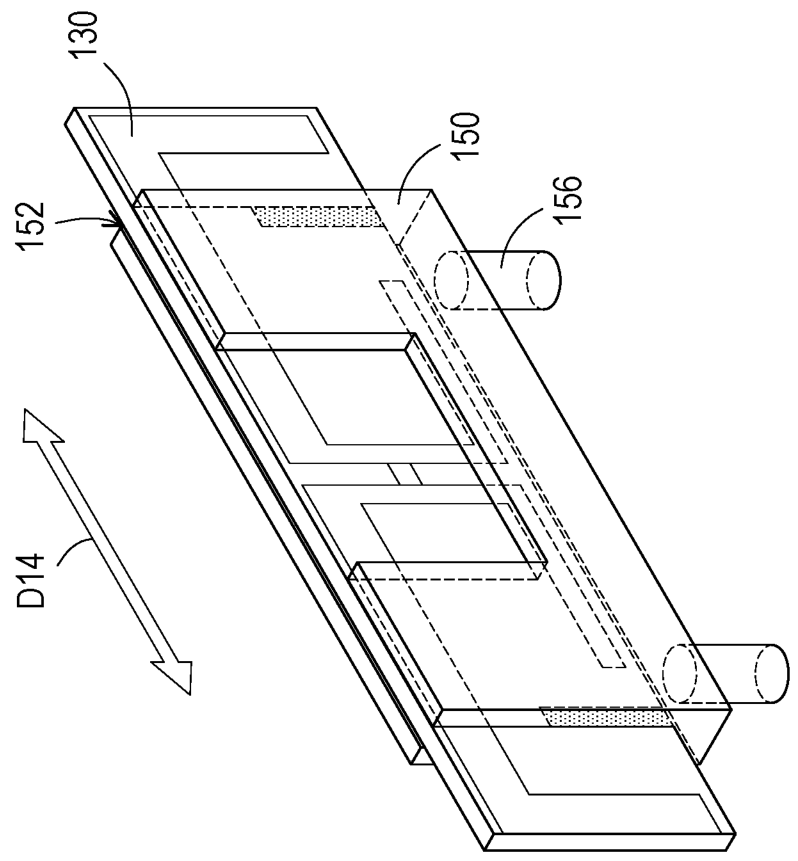
FIG. 2B is a schematic view of the antenna shown in FIG. 1 assembled on the antenna frame.

FIG. 2A is a schematic view of the antenna and the antenna frame of FIG. 1 being assembled. FIG. 2B is a schematic view of the antenna shown in FIG. 1 assembled on the antenna frame. In the network communication device 100 of this embodiment, the antenna 130 is inserted into the slot 152 along the first direction D12. The antenna 130 has a first position-limiting structure 132. The antenna frame 150 further has a second position-limiting structure 154. After the antenna 130 is assembled on the antenna frame 150, the first position-limiting structure 132 is engaged with the second position-limiting structure 154, so the movement of the antenna 130 in the slot 152 in the second direction D14 is restricted. The first direction D12 is perpendicular to the second direction D14. In the network communication device 100 according to the embodiment of the present disclosure, the antenna frame 150 further has a plurality of pins 156.

Figure 2C:
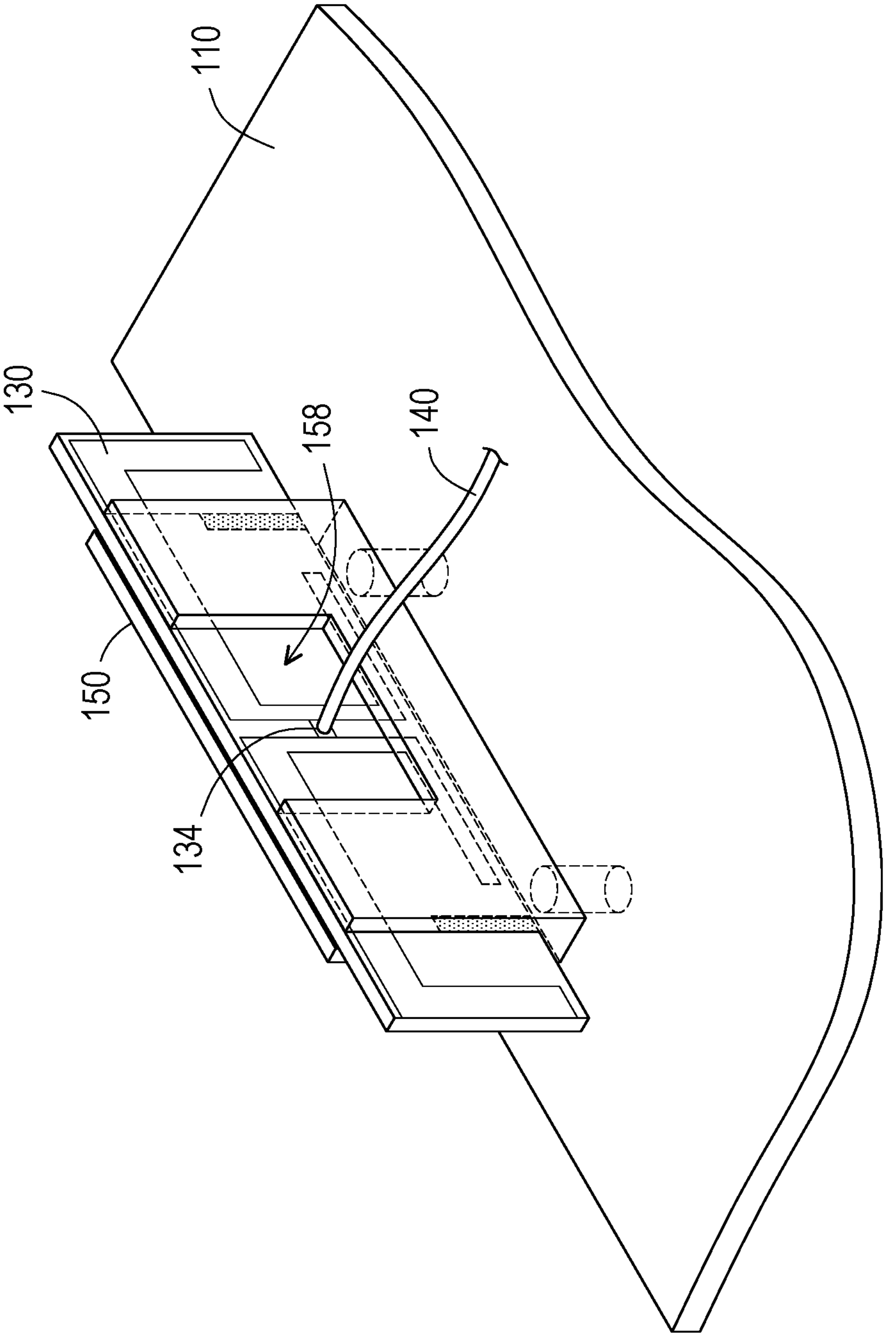
FIG. 2C is a schematic view of the antenna and the antenna frame of FIG. 1 assembled on the circuit board.

FIG. 2C is a schematic view of the antenna and the antenna frame of FIG. 1 assembled on the circuit board. In the network communication device 100 of this embodiment, the pin 156 is inserted into the circuit board 110. The pin 156 may limit the movement of the antenna frame 150 on a plane parallel to the circuit board 110, and since there are multiple pins 156, it is also possible to limit the rotation of the antenna frame 150. In the network communication device 100 of this embodiment, the antenna frame 150 further has an opening 158 for exposing the feeding point 134 of the antenna 130. The signal cable 140 is electrically connected to the feeding point 134. Certainly, the feeding point 134 of the antenna 130 may also be located on two sides or the upper side of the antenna 130 not covered by the antenna frame 150, and such configuration also allows for electrical connection with the signal cable 140. In the network communication device 100 of this embodiment, the antenna frame 150 is integrally formed and therefore is characterized in fast production and low cost.

Figure 3:
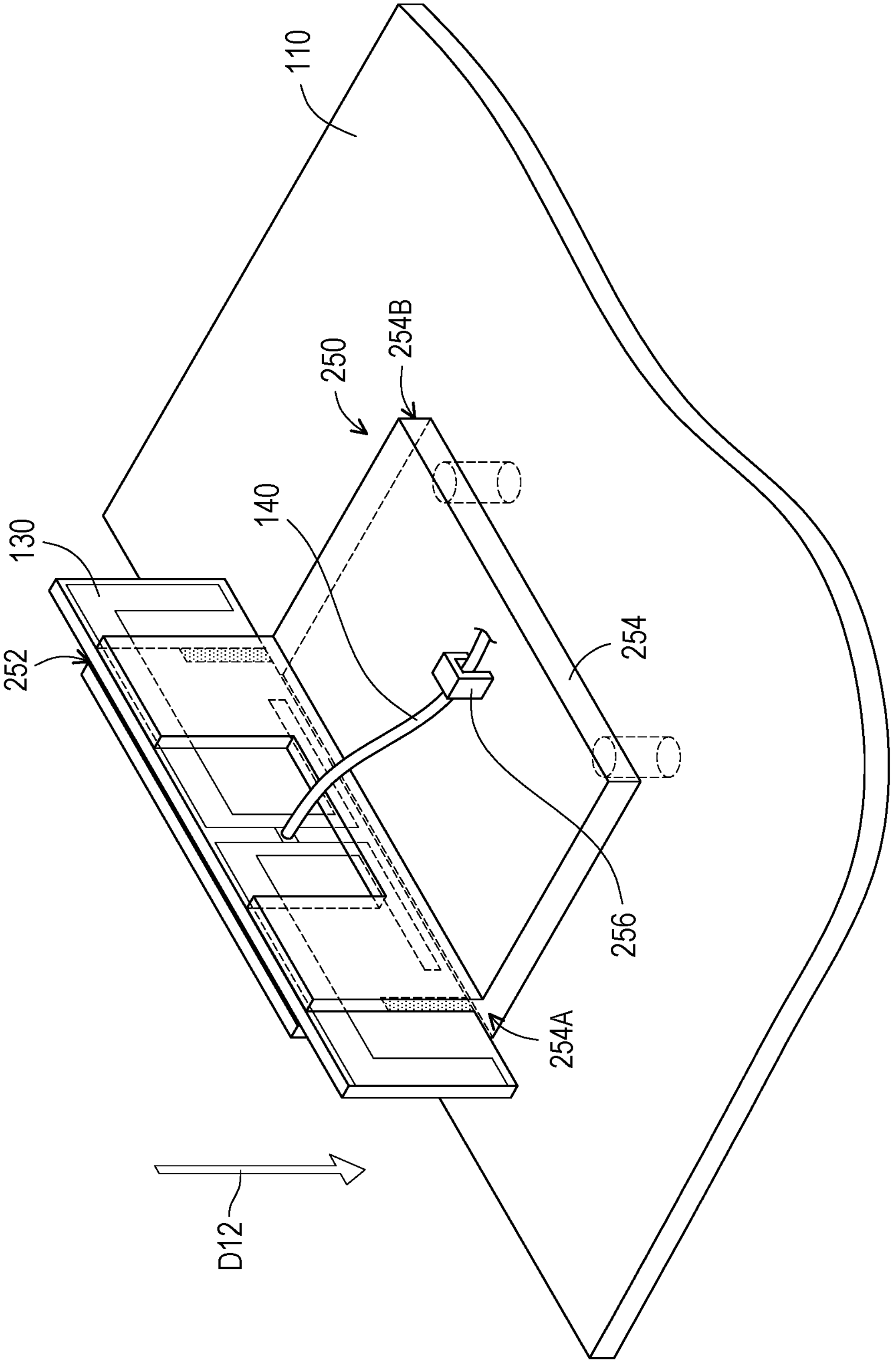
FIG. 3 is a schematic view of an antenna and an antenna frame of a network communication device according to another embodiment of the present disclosure after being assembled on a circuit board.

FIG. 3 is a schematic view of an antenna and an antenna frame of a network communication device according to another embodiment of the present disclosure after being assembled on a circuit board. The network communication device in this embodiment is substantially the same as the network communication device 100 in FIG. 1, and the following description only focuses on the differences between the two. In the network communication device of this embodiment, the antenna frame 250 further has an extension portion 254, the extension portion 254 has a first side 254A and a second side 254B opposite to each other, the slot 252 is located on the first side 254A, and the second side 254B is assembled on the circuit board 110. Since the antenna frame 250 has the extension portion 254, when the antenna 130 might be in conflict with other components of the network communication device 100 (such as electromagnetic interference (EMI)), the position of the antenna 130 may be changed by using the extension portion 254. Moreover, the extension portion 254 may also be used to increase the distance between the antenna 130 and other electronic components, thereby improving the effect of signal transmission and reception.

In the network communication device of this embodiment, the extension portion 254 is parallel to the circuit board 110, the antenna 130 is inserted into the slot 252 along the first direction D12, the extension portion 254 is perpendicular to the first direction D12, and the slot 252 is perpendicular to the circuit board 110, so that the antenna 130 is made to be perpendicular to the circuit board 110, but the present disclosure is not limited thereto. The relative positions between these components may be changed through the design of the antenna frame 250. In the network communication device of this embodiment, the antenna frame 250 further has a cable management portion 256, and a part of the signal cable 140 is located in the cable management portion 256. That is, the antenna frame 250 may also be utilized for cable management, so as to reduce the chance of the signal cable 140 being pulled and improve reliability. The cable management portion 256 may be located on the extension portion 254, but the disclosure is not limited thereto. The antenna frame in other embodiments may also have the same or similar cable management portion.

Figure 4:
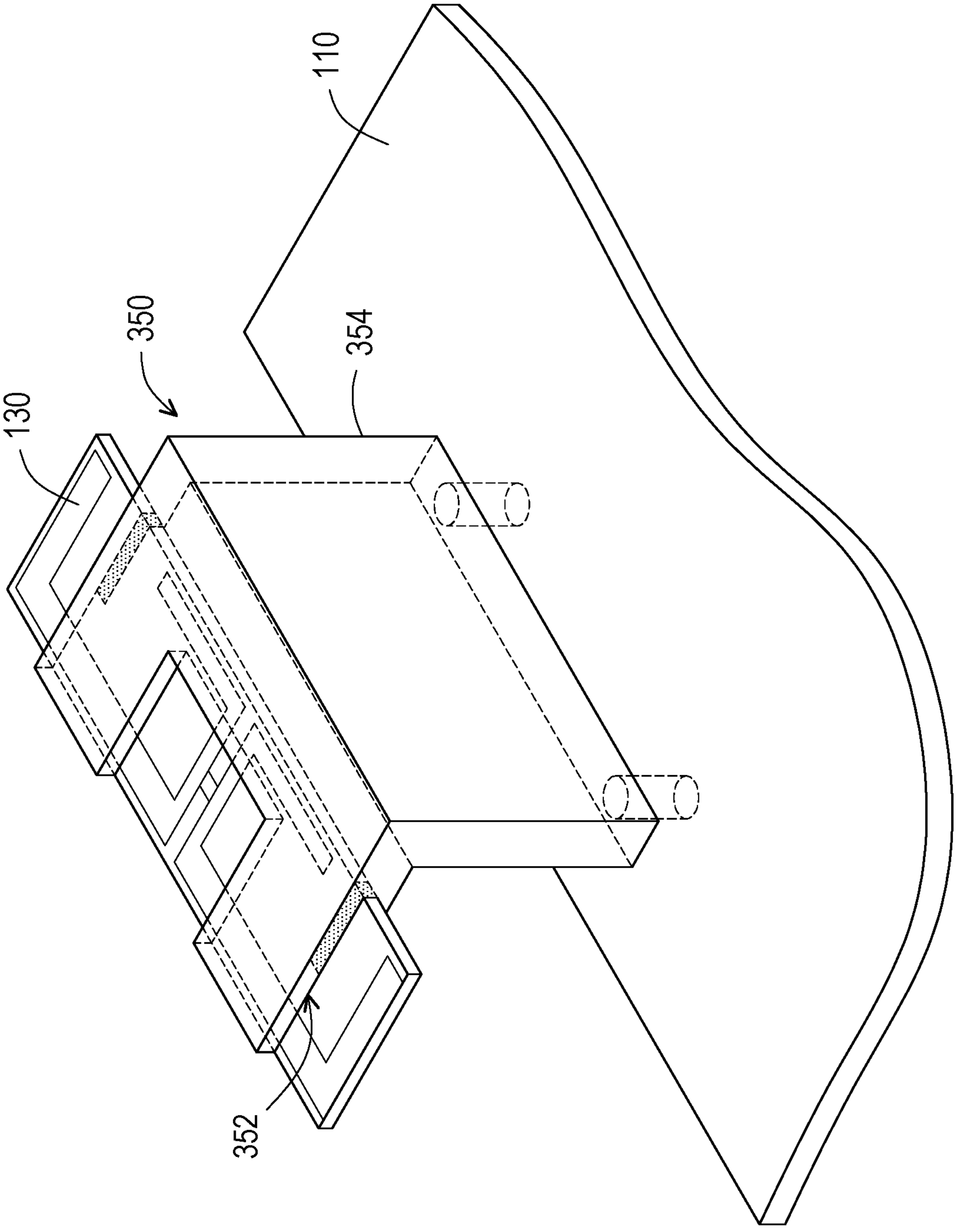
FIG. 4 is a schematic view of an antenna and an antenna frame of a network communication device according to yet another embodiment of the present disclosure after being assembled on the circuit board.

FIG. 4 is a schematic view of an antenna and an antenna frame of a network communication device according to yet another embodiment of the present disclosure after being assembled on the circuit board. The network communication device in this embodiment is substantially the same as the network communication device 100 in FIG. 1, and the following description only focuses on the differences between the two. In the network communication device of this embodiment, the extension portion 354 of the antenna frame 350 is perpendicular to the circuit board 110, and the slot 352 is parallel to the circuit board 110, so that the antenna 130 is parallel to the circuit board 110. That is, the extending direction of the extension portion 354 may be designed according to requirements, and the relative positions between the antenna 130 and the circuit board 110 may also be changed through the design of the antenna frame 350.

Figure 5:
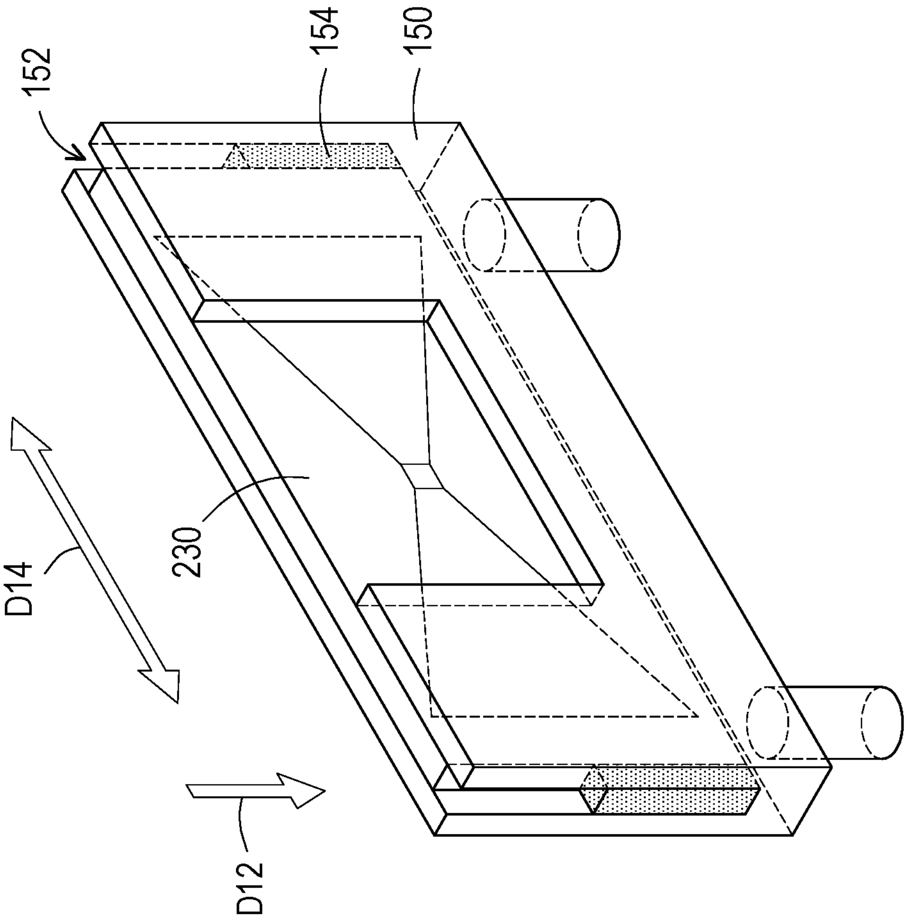
FIG. 5 is a schematic view of an antenna of a network communication device according to still another embodiment of the present disclosure after being assembled on the antenna frame.

FIG. 5 is a schematic view of an antenna of a network communication device according to still another embodiment of the present disclosure after being assembled on the antenna frame. The antenna frame 150 of the network communication device in this embodiment is the same as the antenna frame 150 of the network communication device 100 in FIG. 1, except that the antenna 230 is adopted as replacement. The antenna 230 is inserted into the slot 152 along the first direction D12. Although the size of the antenna 230 is different from that of the antenna 130 in FIG. 1, when the antenna 230 is assembled on the antenna frame 150, the antenna 230 may still be locked in the slot 152, and the second position-limiting structure 154 exactly abuts against both sides of the antenna 230. Therefore, the movement of the antenna 230 in the slot 152 in the second direction D14 is restricted. The first direction D12 is perpendicular to the second direction D14. That is, by properly designing the antenna frame 150, the same antenna frame 150 may be used to accommodate a variety of different antennas, such as printed circuit board antennas, flexible circuit board antennas, iron antennas, etc., thereby saving manufacturing costs.

Figure 6:
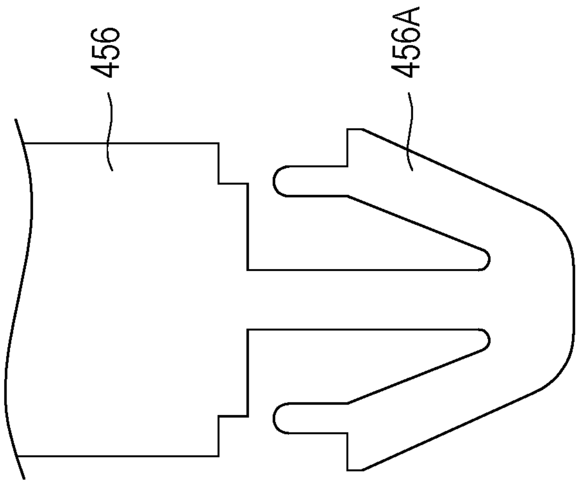
FIG. 6 is a schematic view of a terminal end of a pin of an antenna frame of the network communication device according to an embodiment of the present disclosure.

FIG. 6 is a schematic view of a terminal end of a pin of an antenna frame of the network communication device according to an embodiment of the present disclosure. In the network communication device of this embodiment, the terminal end 456 of the pins have barbs 456A for hooking the circuit board 110 (shown in FIG. 2C). Therefore, when the pins of the antenna frame are inserted into the circuit board 110, the barbs 456A may hook the circuit board 110 to prevent the antenna frame from detaching from the circuit board 110. The barbs 456A may be used in any embodiment of the disclosure.

Figure 7:
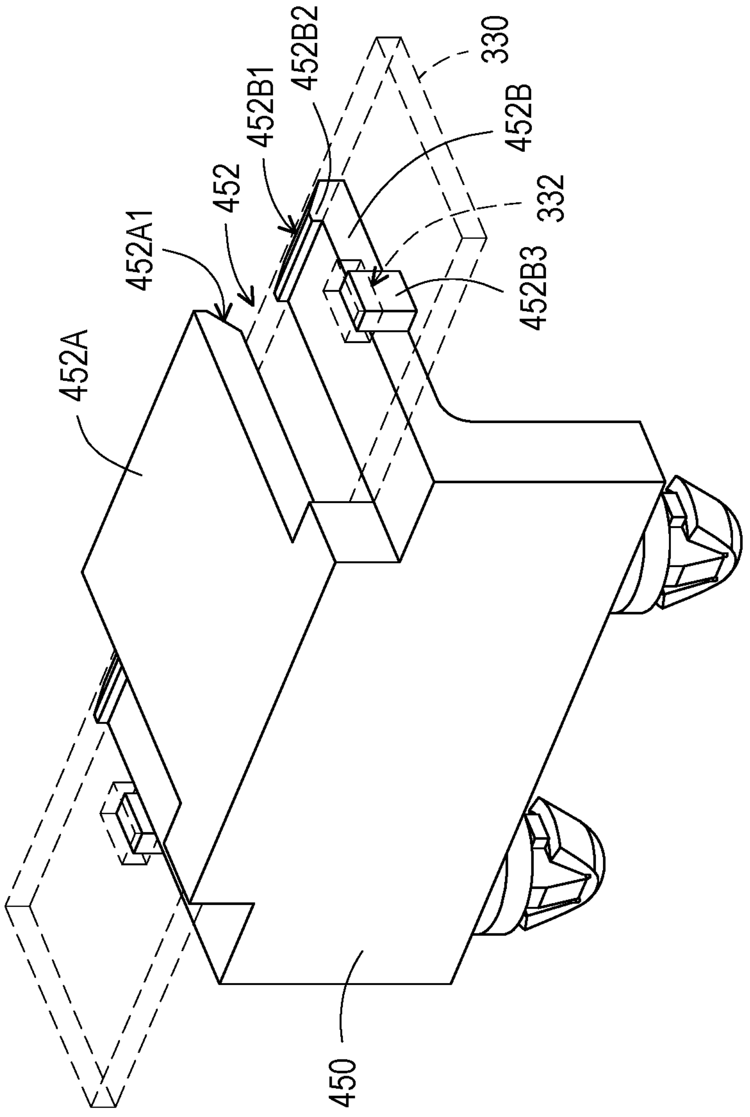
FIG. 7 is a schematic view of an antenna of a network communication device according to still another embodiment of the present disclosure after being assembled on the antenna frame.

FIG. 7 is a schematic view of an antenna of a network communication device according to still another embodiment of the present disclosure after being assembled on the antenna frame. The network communication device in this embodiment is substantially the same as the network communication device 100 in FIG. 1, and the following description only focuses on the differences between the two. The two side walls 452A and 452B of the slot 452 of the antenna frame 450 are staggered from each other, that is, none of the two sides of the antenna 330 is covered by the side walls 452A and 452B simultaneously. The top portion of the side wall 452A is provided with a chamfer 452A1, so that the antenna 330 may be inserted into the slot 452 more easily. The top portion of the side wall 452B not only has a chamfer 452B1, but also has a hook 425B2, which not only makes it easier for the antenna 330 to be inserted into the slot 452, but also can clamp the antenna 330 to prevent the antenna 330 from falling out of the slot 452. Furthermore, the side wall 452B may further have a locking block 452B3, which may be correspondingly locked into the notch or the groove 332 of the antenna 330, and may also clamp the antenna 330 to prevent the antenna 330 from falling out of the slot 452.

Figure 8:
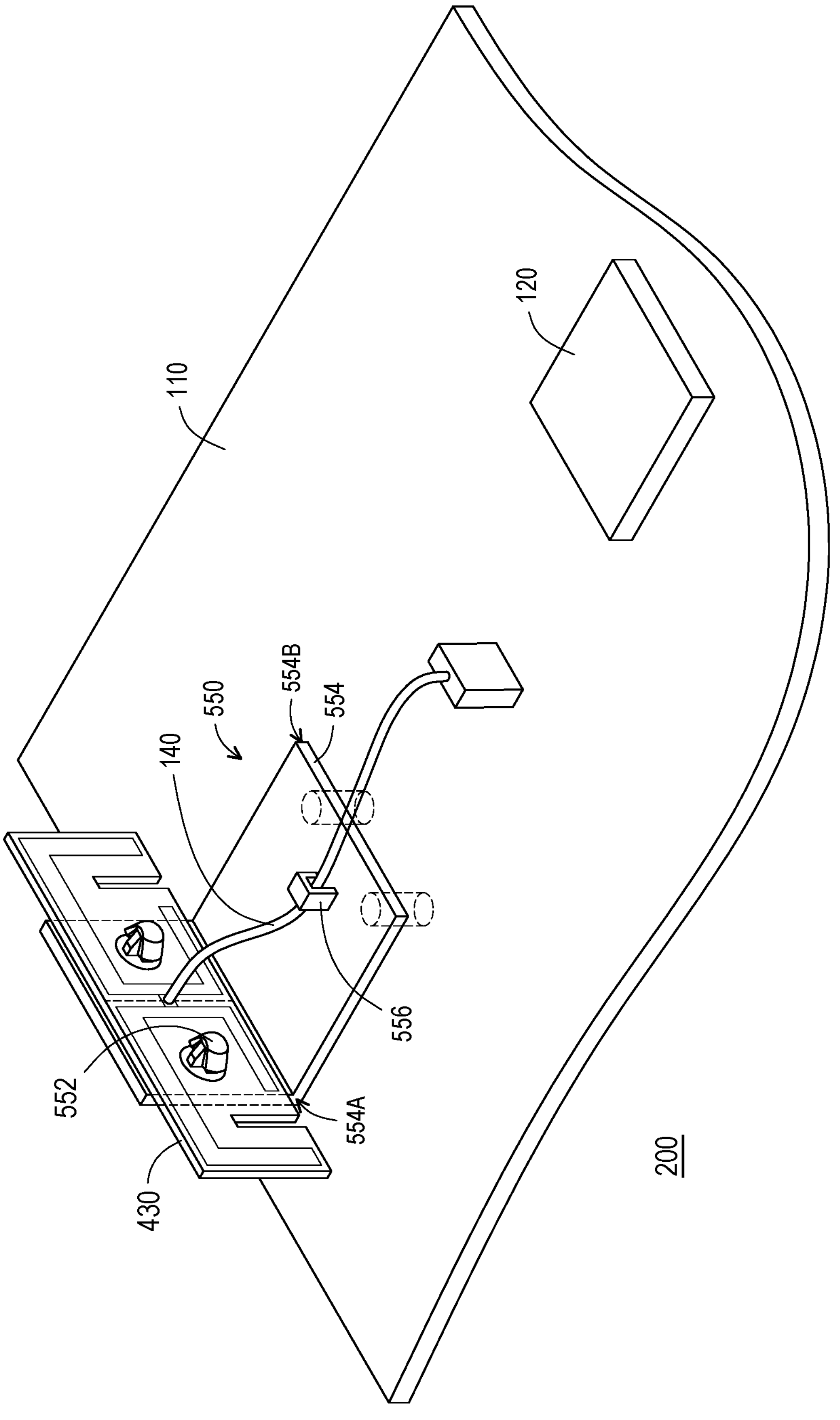
FIG. 8 is a schematic view of an antenna and an antenna frame of a network communication device according to yet another embodiment of the present disclosure after being assembled on the circuit board.

FIG. 8 is a schematic view of an antenna and an antenna frame of a network communication device according to yet another embodiment of the present disclosure after being assembled on the circuit board. The following description only focuses on the differences between this embodiment and other embodiments. The antenna frame 550 of this embodiment has a tenon 552. The tenon 552 passes through the antenna 430 and the antenna 430 is fastened by the tenon 552. The antenna frame 550 further has an extension portion 554, the extension portion 554 has a first side 554A and a second side 554B opposite to each other, the tenon 552 is located on the first side 554A, and the second side 554B is assembled on the circuit board 110. Since the antenna frame 550 has the extension portion 554, when the antenna 430 may be in conflict with other components of the network communication device 200 (such as electromagnetic interference (EMI)), the position of the antenna 430 may be changed by using the extension portion 554. Moreover, the extension portion 554 may also be utilized to increase the distance between the antenna 430 and other electronic components, thereby improving the effect of signal transmission and reception.

In the network communication device of this embodiment, the extension portion 554 is parallel to the circuit board 110, and when the tenon 552 is engaged with the antenna 430, the extension portion 554 is perpendicular to the antenna 430, and the antenna 130 is perpendicular to the circuit board 110, but the present disclosure is not limited thereto. The relative positions between these components may be changed through the design of the antenna frame 550. In the network communication device of this embodiment, the antenna frame 550 further has a cable management portion 556, and a part of the signal cable 140 is located in the cable management portion 556. If the number of extension portion 554 and the cable management portion 556 is reduced, the antenna frame 550 will be similar to the above-mentioned antenna frame 150, and the main difference between the two is that the antenna frame 550 is engaged with the antenna 430 through the tenon 552, while the antenna frame 150 accommodates the antenna 130 through the slot 152. The tenon 552 of this embodiment may be applied to any embodiment of the present disclosure.

Figure 9:
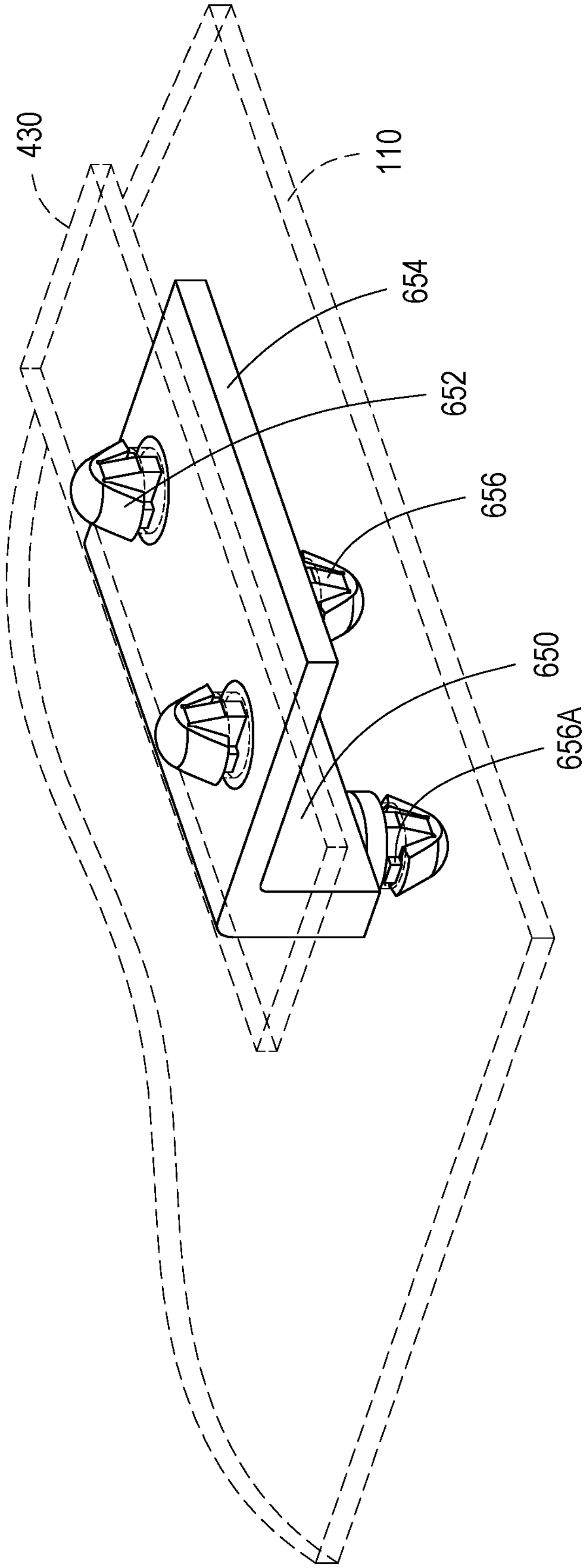
FIG. 9 is a schematic view of an antenna of a network communication device according to still another embodiment of the present disclosure after being assembled on the antenna frame.

FIG. 9 is a schematic view of an antenna of a network communication device according to still another embodiment of the present disclosure after being assembled on the antenna frame. The network communication device in this embodiment is substantially the same as the network communication device 200 in FIG. 8, and the following description only focuses on the differences between the two. In the network communication device of this embodiment, the extension portion 654 of the antenna frame 650 is perpendicular to the circuit board 110, and when the tenon 652 is engaged with the antenna 430, the antenna 430 is parallel to the circuit board 110. That is, the extending direction of the extension portion 654 may be designed according to requirements, and the relative positions between the antenna 430 and the circuit board 110 may also be changed through the design of the antenna frame 650. The antenna frame 650 of this embodiment further has a plurality of pins 656. The pins 656 are inserted into the circuit board 110. The pins 656 may limit the movement of the antenna frame 650 on a plane parallel to the circuit board 110, and since there are multiple pins 656, they may also limit the rotation of the antenna frame 650. When the pins 656 of the antenna frame 650 are inserted into the circuit board 110, the barbs 656A may hook the circuit board 110 to prevent the antenna frame 650 from detaching from the circuit board 110. The barbs 656A may be used in any embodiment of the disclosure.

In summary, in the embodiment of the present disclosure, the antenna is detachably fixed directly on the antenna frame, and the antenna frame is detachably directly fixed on the circuit board. Therefore, the antenna is indirectly fixed on the circuit board instead of being directly fixed on the housing, so there is no need to worry about the problem that the antenna will be pulled during the process of assembling the circuit board and the housing, and the assembly is simple and fast with low cost.

What is claimed is:

1. A network communication device, comprising:

a circuit board;

a network communication chip, disposed on the circuit board;

an antenna;

a signal cable, electrically connected to the antenna and the circuit board; and an antenna frame, assembled on the circuit board, wherein the antenna frame has a first slot and a positioning limiting structure, and the antenna is engaged in the first slot, wherein the antenna has a second slot, and the second slot is engaged with the positioning limiting structure.

2. The network communication device according to claim 1, wherein the antenna is engaged in the first slot along a first direction, the second slot is engaged with the position-limiting structure to limit a movement of the antenna in the first slot in a second direction, and the first direction is perpendicular to the second direction.

3. The network communication device according to claim 1, wherein the antenna frame further has an opening for exposing a feeding point of the antenna, and the signal cable is electrically connected to the feeding point.

4. The network communication device according to claim 1, wherein the antenna frame further has a plurality of pins, and the pins are inserted into the circuit board, ends of the pins have barbs to hook on the circuit board.

5. The network communication device according to claim 1, wherein the antenna frame further has an extension portion, the extension portion has a first side and a second side opposite to each other, the first slot is located on the first side, and the second side is assembled on the circuit board.

6. The network communication device according to claim 1, wherein the antenna frame further has a cable management portion, a part of the signal cable is located in the cable management portion, and the antenna frame is assembled on a lateral side of the circuit board.

* * * * *